United States Patent [19]

Maiwald et al.

[11] Patent Number: 5,464,243
[45] Date of Patent: Nov. 7, 1995

[54] ADJUSTABLE AXLE WITH SHIM STRUCTURE

[75] Inventors: Marvin A. Maiwald, Ankeny; Donald K. Davenport, Woodburn, both of Iowa

[73] Assignee: Deere & Company, Moline, Ill.

[21] Appl. No.: 372,751

[22] Filed: Jan. 13, 1995

[51] Int. Cl.⁶ .................................................. B60B 35/10
[52] U.S. Cl. ........................ 280/638; 180/906; 301/128
[58] Field of Search ................................. 180/906, 209, 180/340; 280/638, 656; 301/128

[56] References Cited

U.S. PATENT DOCUMENTS

| | | | |
|---|---|---|---|
| 2,151,045 | 3/1939 | Ploehn | 301/128 |
| 3,964,565 | 6/1976 | Cagle et al. | 280/638 |
| 4,040,643 | 8/1977 | Applequist et al. | 280/656 |
| 4,449,600 | 5/1984 | Telfer | 280/638 |
| 5,083,630 | 1/1992 | Zaun | 180-/209 |
| 5,121,808 | 6/1992 | Visentini et al. | 180/906 |

FOREIGN PATENT DOCUMENTS 0209724  6/1990  Germany ............................. 280/638

0013135  1/1979  Japan ..................................... 180/906

*Primary Examiner*—Margaret A. Focarino
*Assistant Examiner*—Peter C. English

[57] ABSTRACT

Adjustable axle or similar telescoping structure includes an outer frame tube of square section which telescopingly receives an inner tube having a top shim-contacting surface, two parallel side surfaces, and a lower wall of inverted V-shaped section defining two additional downwardly directed shim-contacting surfaces. Three flat plates of a polymer material are supported between the three shim-contacting surfaces and the outer frame tube. One pad is attached to the upper surface on the inside of the outer tube. The remaining two pads are connected to a wedge-shaped steel bar and are oriented upwardly by the bar to contact the two shim-contacting surfaces on the inverted V-shaped section. The bottom wall of the outer frame tube is drilled and nuts are welded onto the outer surface to receive bolts which are screwed into the nuts to contact the bottom of the bar. When the bolts are tightened, they force the inner tube upward so it contacts the upper pad. Counter bores in the bottom of the bar prevent the bar from moving while axle length is being adjusted.

20 Claims, 2 Drawing Sheets

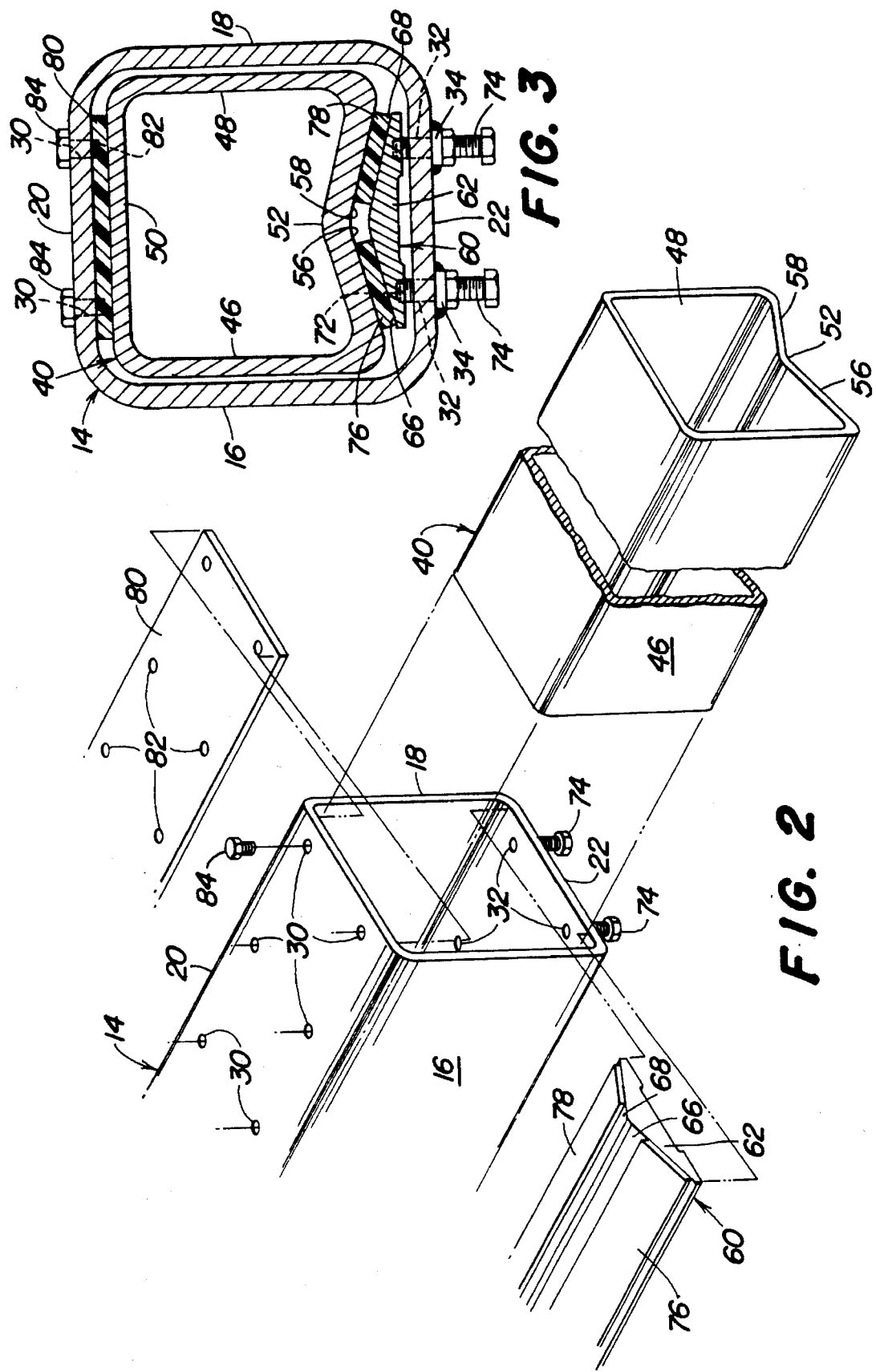

ADJUSTABLE AXLE WITH SHIM STRUCTURE

BACKGROUND OF THE INVENTION

1. Field of the Invention

The present invention relates generally to adjustable axles on agricultural equipment such has self-propelled sprayers, and, more specifically, to a shim structure for maintaining a tight fit on a telescoping axle.

2. Related Art

Self-propelled agricultural vehicles often require structure to adjust wheel spacing. To accommodate different row spacings in row crop applications, for example, the wheel spacing on a sprayer may have to be changed numerous times over a season as the vehicle operates in different fields. Various types of axle telescoping structure with shimming arrangements are available to adjust tread, but most suffer from one or more disadvantages. A typical telescoping axle structure utilizes inner and outer tubes of generally square cross section. During initial assembly of the axle structure, shim plates are added between the tubes, and the number of plates varies with the tolerance of the inner and outer tubes of the telescoping assembly. Therefore the number of plates must be chosen carefully, and often all four sides of the tubes must be shimmed for a snug fit. If additional shim plates later become necessary after the assembly loosens as a result of wear and tear, the axle must be disassembled to add the plates. Providing a quick, simple, and effective means of shimming an adjustable axle with telescoping tubes of square section, both during initial assembly and later repair or refurbishing, and maintaining snug fit over the life of the machine, have been continuing problems.

BRIEF SUMMARY OF THE INVENTION

It is therefore an object of the present invention to provide an improved telescoping device that overcomes at least most of the above problems. It is a further object to provide such a device with a shimming arrangement which facilitates assembly and adjustment of the device and is particularly useful on adjustable axles for agricultural vehicles or similar telescoping structures.

It is a still a further object of the present invention to provide an improved shim arrangement for an adjustable axle on an agricultural vehicle or other similar telescoping tube arrangement. It is still another object of the present invention to provide an improved shim arrangement which is easy to assemble and snugly holds telescoping portions of an axle assembly during vehicle operation and which can be adjusted quickly and easily without any disassembly of the axle structure.

It is still a further object of the invention to provide an improved telescoping axle structure on an agricultural vehicle such as a self-propelled sprayer which eliminates need to shim all sides of the telescoping tubes. It is another object to provide such a structure which is easy to assemble and adjust.

An axle structure constructed in accordance with the teachings of the present invention includes an outer frame tube of square section which telescopingly receives an inner tube which is part of a specially shaped casting having a top shim-contacting surface, two parallel side surfaces, and a lower wall of V-shaped section defining two additional shim-contacting surfaces. Three flat plates or pads of a polymer material such as Nylatron are supported between the three shim-contacting surfaces and the outer frame tube. One pad is attached to one surface on the inside of the outer tube. The remaining two pads are connected to a wedge-shaped steel bar and are supported by the bar to contact the two shim-contacting surfaces on the V-shaped section. The wall of the outer frame tube is drilled and nuts are welded onto the outer surface to receive bolts which contact the bar. When the bolts are tightened, they force the inner tube towards the opposite pad. Counter bores in the bar prevent bar movement while axle length is being adjusted.

The axle design provides a snug fit between tubes and ease of assembly and adjustment. The V-shaped section provides side-to-side centering of the inner tube relative to the outer tube so need for side shims is eliminated. The shimming arrangement is relatively simple and easy to assemble, very reliable and facilitates quick adjustment of wheel spacing.

These and other objects, features and advantages of the present invention will become apparent to one skilled in the art upon reading the following detailed description in view of the drawings.

BRIEF DESCRIPTION OF THE DRAWINGS

FIG. 2 is an exploded view of a portion of the adjustable axle of FIG. 1.

FIG. 3 is a sectional view of the telescoping axle of FIG. 1 showing details of the shimming arrangement.

DETAILED DESCRIPTION OF THE DRAWINGS

Figure 1:
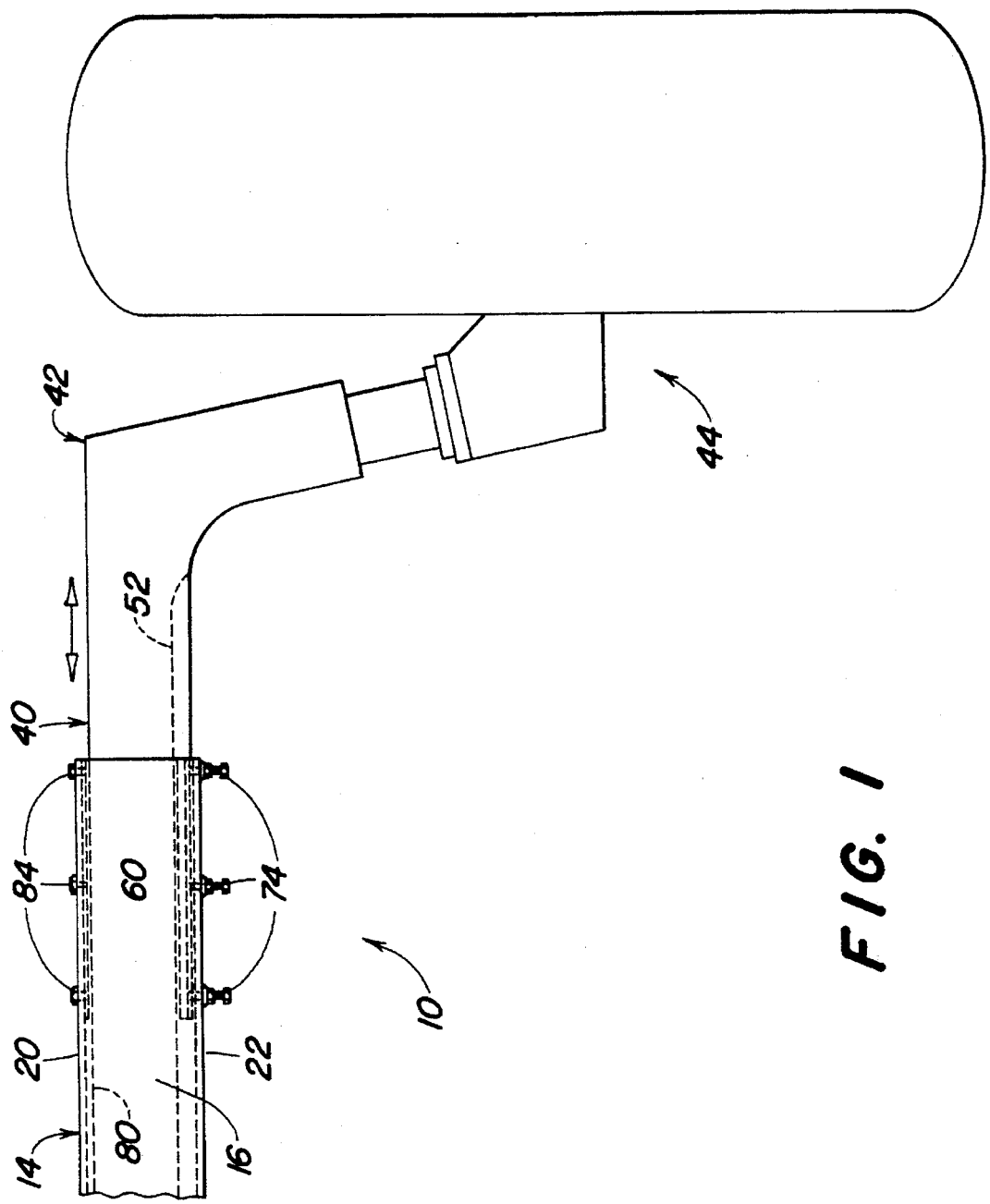
FIG. 1 is a front view of an adjustable telescoping axle.

Referring now to FIG. 1, therein is shown an adjustable axle portion 10 of an agricultural vehicle such as a self-propelled sprayer. Although an agricultural vehicle is shown, it is to be understood that the present invention may also be utilized with other adjustable telescoping tube structures, such as telescoping boom assemblies. An outer frame tube 14 which is rectangular or square in section extends transversely from the remaining portion of the vehicle main frame and includes outer sidewalls 16 and 18 (FIGS. 2 and 3) connected by upper and lower walls 20 and 22. The upper and lower walls 20 and 22 are each apertured at six locations 30 and 32, respectively, near the outer end of the tube 14, and weld nuts 34 are welded to the bottom face of the lower wall 22 at the aperture locations 32.

An inner tube 40 of a wheel supporting knee casting 42 is supported within the outer frame tube 20. A steerable wheel assembly 44 (FIG. 1) is supported from the outermost end of the knee casting 42, and the inner tube 40 is slidably received within the tube 14. The inner tube 40 has upright sidewalls 46 and 48 located between the sidewalls 16 and 18. The spacing between the outer faces of the sidewalls 46 and 48 is slightly less than the inner sidewall spacing of the sidewalls 16 and 18 (FIG. 3). The sidewalls 46 and 48 are connected by a generally horizontal top wall 50 and a lower inverted V-shaped wall 52 with upwardly directed inclined surfaces 56 and 58 converging toward the center of the tube. The V-shaped wall 52 extends substantially the length of the inner tube 40.

A metal wedge-shaped or triangular-shaped bar/pad assembly 60 is supported inside the frame tube 14 near the outer end of the tube and includes a bar 62 with pad support surfaces 66 and 68 which lie generally in planes parallel to the surfaces 56 and 58. Counter bores 72 located in the bottom of the bar 62 align with the aperture locations 32, and bolts 74 are screwed into the weld nuts 34 to project into the counter bores 72 and hold the bar/pad assembly 60 against movement when the axle length is being adjusted. Lower pads 76 and 78, preferably fabricated from a polymer material such as Nylatron, are supported on the surfaces 66 and 68 and contact the inner tube surfaces 56 and 58. As the bolts 74 are tightened, they force the pads 76 and 78 against the wall 52, center the inner tube 40 relative to the frame tube 14, and move the inner tube 40 upwardly.

An upper pad 80, also made of a polymer such as Nylatron, is supported under the upper wall 20 of the frame tube and includes steel threaded inserts 82 which align with the aperture locations 30. Bolts 84 are screwed through the aperture locations 30 and into the inserts 82 (FIGS. 1 and 2) to prevent unwanted movement of the pad 80 during assembly and adjustment.

Once the tube 40 has been assembled in the tube 14, the bolts 74 are tightened just enough to force the tube 40 upwardly against the upper pad 80 for a snug fit. The pads 76, 78 and 80 firmly secure the tube 40 against any unwanted movement relative to the tube 14 while still permitting the tubes to telescope. A cylinder (not shown) may be used to move the tube 40 relative to the tube 14.

The self-centering action of the mating inverted V-shaped pad/bar assembly 60 and lower wall 52 provide good tube side-to-side centering without need for side shim pads. As the pads 76, 78 and 80 wear over time with tread adjustments and vehicle operation, the bolts 74 can be easily turned as necessary to move the assembly 60 upwardly so that a snug fit is maintained.

Having described the preferred embodiment, it will become apparent that various modifications can be made without departing from the scope of the invention as defined in the accompanying claims. For example, the structure shown in FIGS. 2 and 3 may be rotated 180 degrees so that the wall 52 and the pad assembly 60 are at the top and the bolts 74 project upwardly instead of downwardly as shown. Also, for example, the orientation of the angled surfaces associated with the inner tube wall 52 and with the pad assembly 60 may be reversed so that surfaces converge in the opposite direction from that shown in FIGS. 2 and 3, with the pads 76 and 78 facing inwardly in the upward direction rather than outwardly as shown.

We claim:

1. In a telescoping assembly for a vehicle such as an agricultural sprayer having a fore-and-aft extending main frame, a first tube extending outwardly from the main frame, a second tube telescopingly received by the first tube, the first tube having a generally rectangular cross section with upright sidewalls and upper and lower walls connecting the sidewalls, and the second tube having spaced sidewalls supported between the upright sidewalls and a non-planar wall having a generally V-shaped configuration, first pad structure conforming to the V-shaped configuration supported between the first and second tubes, and an adjustable pad support located between the first and second tubes and contacting the first pad structure for selectively moving the first pad structure against the non-planar wall to locate the second tube relative to the upright sidewalls.

2. The invention as set forth in claim 1 further comprising second pad structure supported between the first and second tubes, wherein the second tube is sandwiched between the first and second pad structures when the first pad structure is moved against the non-planar wall.

3. The invention as set forth in claim 2 wherein the second tube has a generally horizontal top wall connecting spaced sidewalls offset inwardly from the spaced sidewalls of the first tube, and the non-planar wall connects lower portions of the spaced sidewalls of the second tube, and wherein the second pad structure is supported between the upper wall and the top wall.

4. The invention as set forth in claim 3 wherein spaces are defined between the spaced sidewalls of the second tube and the upright sidewalls of the first tube when the first pad structure is moved against the non-planar wall, and wherein the spaces are substantially devoid of pad structure, the first pad structure providing substantially all locating of the second tube relative to the upright sidewalls of the first tube.

5. The invention as set forth in claim 2 including means for preventing relative movement between the second pad structure and the first tube during assembly of the first and second tubes.

6. The invention as set forth in claim 5 wherein the means for preventing relative movement comprises bore structure located in the second pad structure, and bolt structure selectively movable through a portion of the first tube and into the bore structure.

7. The invention as set forth in claim 1 wherein the adjustable pad support includes bar structure having inclined surfaces, and wherein the first pad structure comprises pads supported on the bar structure and adapted for engagement of the non-planar wall.

8. The invention as set forth in claim 7 wherein the pads comprise a polymer material.

9. The invention as set forth in claim 7 wherein the bar structure includes bore structure, and bolt structure extending into the bore structure for preventing axial movement of the adjustable pad support as the first and second tubes are telescoped.

10. The invention as set forth in claim 7 wherein the bar structure comprises a transversely extending bar having a flat lower surface and a generally triangular-shaped cross section defining the inclined surfaces, wherein the inclined surfaces are planar and the pads are supported on the inclined surfaces.

11. In a telescoping assembly for a vehicle having a fore-and-aft extending main frame, a first tube extending transversely from the main frame, a second tube telescopingly received by the first tube, the first tube having a generally rectangular cross section with upright sidewalls and upper and lower walls connecting the sidewalls, and the second tube having spaced sidewalls supported between the upright sidewalls and a non-planar lower wall having first and second inclined surfaces converging toward the center of the second tube, pad structure supported between the first and second tubes adjacent the inclined surfaces, and means for selectively moving the pad structure against the inclined surfaces to locate and secure the second tube relative to the first tube.

12. The invention as set forth in claim 11 wherein the pad structure includes surfaces adapted for mating with the inclined surfaces, the surfaces locating the second tube relative to the upright sidewalls of the first tube as the pad structure is moved against the inclined surfaces.

13. The invention as set forth in claim 12 wherein the second tube includes a top wall connecting the spaced sidewalls, and further comprising an upper pad supported between the upper wall of the first tube and top wall of the second tube.

14. The invention as set forth in claim 13 wherein the pad structure comprises a polymer pad.

15. The invention as set forth in claim 11 wherein the second tube comprises an elongated casting having inner and outer ends with a wheel support located at the outer end, and wherein the non-planar lower wall extends from a location adjacent the wheel support to the inner end.

16. Adjustable length telescoping tube structure for a vehicle, the structure including an outer frame tube of rectangular section, an inner tube telescopingly received in the frame tube, the inner tube having a top shim-contacting surface, two parallel side surfaces, and a bottom wall having at least a partial V-shaped section defining angled shim-contacting surfaces, flat plates of a polymer material supported between the shim-contacting surfaces and the outer frame tube, and shim adjusting means for adjusting the plates relative to the tubes to provide a snug fit between the tubes while facilitating relative axial movement between the tubes to adjust tube structure length.

17. The invention as set forth in claim 16 including a plate support of wedge-shaped cross section adjustably carried by a lower wall of the frame tube between said lower wall and the bottom wall of the inner tube, wherein at least one of the flat plates is carried by the plate support.

18. The invention as set forth in claim 17 wherein the plate support includes pad support surfaces generally parallel to the angled shim-contacting surfaces and providing a centering function for the inner tube relative to the frame tube.

19. The invention as set forth in claim 16 including means for facilitating assembly of the plates in the tubes while preventing unwanted relative movement of the plates and frame tube during adjustment of the telescoping tube structure.

20. The invention as set forth in claim 16 wherein the inner tube comprises an elongated casting having inner and outer ends with a wheel support located at the outer end, and wherein the bottom wall extends from a location adjacent the wheel support to the inner end.

* * * * *